(12) United States Patent
Okamoto et al.

(10) Patent No.: US 10,274,105 B2
(45) Date of Patent: Apr. 30, 2019

(54) SPOOL VALVE

(71) Applicant: Eagle Industry Co., Ltd., Tokyo (JP)

(72) Inventors: Eiji Okamoto, Tokyo (JP); Satoshi Shimizu, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/511,524

(22) PCT Filed: Sep. 18, 2015

(86) PCT No.: PCT/JP2015/076685
§ 371 (c)(1),
(2) Date: Mar. 15, 2017

(87) PCT Pub. No.: WO2016/047597
PCT Pub. Date: Mar. 31, 2016

(65) Prior Publication Data
US 2017/0292632 A1    Oct. 12, 2017

(30) Foreign Application Priority Data

Sep. 24, 2014 (JP) .................... 2014-194207

(51) Int. Cl.
*F16K 11/07* (2006.01)
*F16K 47/08* (2006.01)
(Continued)

(52) U.S. Cl.
CPC ............ *F16K 47/08* (2013.01); *F16K 11/07* (2013.01); *F16K 27/041* (2013.01); *G05D 16/04* (2013.01); *Y10T 137/8671* (2015.04)

(58) Field of Classification Search
CPC ........ F16K 47/08; F16K 11/07; F16K 27/041; Y10T 137/86694; Y10T 137/8671; Y10T 137/8667; Y10T 137/86574; G05D 16/04
(Continued)

(56) References Cited

U.S. PATENT DOCUMENTS

| 2013/0099147 A1 | 4/2013 | Schmidt |
| 2015/0369092 A1* | 12/2015 | Parker .................... F16K 11/07 |
| | | 123/90.12 |

FOREIGN PATENT DOCUMENTS

| JP | 2005-133880 A | 5/2005 |
| JP | 2009-243544 A | 10/2009 |
| JP | 2011-236964 A | 11/2011 |

OTHER PUBLICATIONS

Translation of JP2005-133880.*

* cited by examiner

*Primary Examiner* — Kevin F Murphy
*Assistant Examiner* — Kelsey E Cary
(74) *Attorney, Agent, or Firm* — Harness, Dickey & Pierce, P.L.C.

(57) ABSTRACT

A spool 220 is provided with a second land section 224 that blocks a portion between the spool 220 and the valve sleeve 210 at a position between the output port P21 and the lead-in port P22 when the spool 220 is located in a position for connecting the channel for input T1 and the channel for output T2 via the input port P10 and the output port P21 and blocking a channel leading from the channel for output T2 to the channel for discharge T3, and when the spool 220 is located in a position for connecting the channel for output T2 and the channel for discharge T3 via the lead-in port P22 and the discharge port P30 and blocking a channel leading from the channel for input T1 to the channel for output T2.

8 Claims, 7 Drawing Sheets

(51) Int. Cl.
*F16K 27/04* (2006.01)
*G05D 16/04* (2006.01)

(58) Field of Classification Search
USPC .............. 137/625.67, 625.69, 625.25, 625.5
See application file for complete search history.

SPOOL VALVE

CROSS-REFERENCE TO RELATED APPLICATIONS

This application is a National Stage of International Application No. PCT/JP2015/076685, filed Sep. 18, 2015 (now WO 2016/047597A1), which claims priority to Japanese Application No. 2014-194207, filed Sep. 24, 2014. The entire disclosures of each of the above applications are incorporated herein by reference.

FIELD

The present disclosure relates to a spool valve used for control of a fluid pressure.

BACKGROUND

In various apparatuses such as an automobile, a spool valve driven by an actuator such as a solenoid is widely used in order to control a fluid pressure such as a hydraulic pressure. In the spool valve, when force generated by a flow of fluid acts on a spool, it may adversely affect the control. Therefore, in order to suppress such force from acting on the spool, measures such as providing a structure for guiding a direction in which the fluid flows are taken (see PTL 1). A spool valve according to a conventional example is explained below with reference to FIG. 7. FIG. 7 is a schematic sectional view showing the vicinity of a main constituent portion of the spool valve according to the conventional example.

A spool valve 600 according to the conventional example includes a valve sleeve 610 and a spool 620 that reciprocates in the axis direction in the valve sleeve 610. The spool 620 is driven by an actuator such as a solenoid.

The valve sleeve 610 includes an input port P61, an output port P62, and a discharge port P63. On the inner circumferential surface of the valve sleeve 610, a first annular convex section 611 is provided on the opposite side to the output port P62 across the input port P61, a second annular convex section 612 provided between the input port P61 and the output port P62, and a third annular convex section 613 provided between the output port P62 and the discharge port P63.

The spool 620 includes, in order from the input port P61 side toward the discharge port P63 side, a first land section 621, a first small diameter section 622, a guide section 623, a second small diameter section 624, and a second land section 625.

The spool 620 is configured to be capable of moving to a first position for discharging fluid having desired pressure from the output port P62 and a second position for discharging the fluid from the discharge port P63. FIG. 7 shows a case in which the spool 620 is located in the first position. In this case, the outer circumferential surface of the first land section 621 is in contact with the inner circumferential surface of the first annular convex section 611 and separated from the second annular convex section 612. The outer circumferential surface of the second land section 625 is in contact with the inner circumferential surface of the third annular convex section 613. Therefore, a channel leading from the input port P61 to the output port P62 is formed. A channel leading from the output port P62 to the discharge port P63 is blocked. Consequently, the fluid flowed in from the input port P61 is discharged from the output port P62 (see an arrow R10 in the figure).

Note that, when the spool 620 further moves to the second position on the left side in the figure, the outer circumferential surface of the first land section 621 is in contact with the inner circumferential surface of the second annular convex section 612 and the outer circumferential surface of the second land section 625 is separated from the third annular convex section 613. Therefore, the channel leading from the input port P61 to the output port P62 is blocked. The channel leading from the output port P62 to the discharge port P63 is formed. Consequently, the fluid is discharged from the discharge port P63.

In the conventional example, a taper surface 623a gradually decreasing in diameter from the guide section 623 toward the first land section 621 side is provided. Consequently, the fluid flowed in from the input port P61 smoothly flows toward the output port P62. Consequently, it is possible to suppress force generated by the flow of the fluid from acting on the spool 620 and adversely affecting fluid pressure control.

However, even in the spool valve 600 according to the conventional example configured as explained above, a part of the fluid flows into a region X on the opposite side to the taper surface 623a via the guide section 623. Therefore, force pushing the spool 620 toward the input port P61 side acts with a fluid pressure in the region X and adversely affects the fluid pressure control. Therefore, there is still room of improvement.

CITATION LIST

Patent Literature

[PTL 1] Japanese Patent Application Laid-open No. 2011-236964

SUMMARY

Technical Problem

An object of the present disclosure is to provide a spool valve capable of suppressing an adverse effect on fluid pressure control due to a fluid pressure acting on a spool.

Solution to Problem

The present disclosure adopts means explained below in order to solve the problems.

That is, a spool valve of the present disclosure is a spool valve including a spool that reciprocates in a valve sleeve. The valve sleeve includes: an input port disposed to be connected to a channel for input; an output port which is disposed to be connected to a channel for output and discharges fluid flowed in from the input port, to the channel for output; a discharge port disposed to be connected to a channel for discharge; and a lead-in port which is disposed to be connected to the channel for output and guides the fluid into the valve sleeve in order to discharge the fluid from the discharge port. The spool is provided with a blocking section that blocks a portion between the spool and the valve sleeve at a position between the output port and the lead-in port when the spool is located in a position for connecting the channel for input and the channel for output via the input port and the output port and blocking a channel leading from the channel for output to the channel for discharge, and when the spool is located in a position for connecting the channel for output and the channel for discharge via the lead-in port and the discharge port and blocking a channel leading from the channel for input to the channel for output.

According to the present disclosure, in a state in which the channel for input and the channel for output are connected via the input port and the output port, the passage between the spool and the valve sleeve is blocked by the blocking section in the position between the output port and the lead-in port. Consequently, when the fluid flows from the channel for input to the channel for output, it is possible to suppress the fluid from circulating to the opposite side to the output port via the blocking section. Therefore, when the fluid flows from the channel for input to the channel for output, it is possible to suppress the spool from receiving a fluid pressure from the opposite side to the output port via the blocking section.

In a state in which the channel for output and the channel for discharge are connected via the lead-in port and the discharge port, the passage between the spool and the valve sleeve is blocked by the blocking section in the position between the output port and the lead-in port. Consequently, when the fluid flows from the channel for output to the channel for discharge, it is possible to suppress the fluid from circulating to the opposite side to the discharge port via the blocking section. Therefore, when the fluid from the channel for output to the channel for discharge, it is possible to prevent the spool from receiving a fluid pressure from the opposite side to the discharge port via the blocking section.

It is desirable that the blocking section is disposed between an input side land section provided on the input port side and an output side land section provided on the output port side, and an outer diameter of the blocking section is set to be equal to an outer diameter of the input side land section.

Consequently, when the fluid flows from the channel for input to the channel for output, a fluid pressure acting on the input side land section in the axis direction and a fluid pressure acting on the blocking section in the axis direction can be set to forces in opposite directions and substantially the same. Therefore, it is possible to substantially eliminate the influence of force in the axis direction on the spool due to the fluid pressure.

It is desirable that the spool valve includes an inclined surface with a diameter gradually decreasing in diameter from the blocking section toward the input side land section side to guide a flow of the fluid flowing from the input port to the output port.

Consequently, when the fluid flows from the channel for input to the channel for output, it is possible to suppress force generated by the flow of the fluid from acting on the spool.

It is desirable that the spool valve includes an inclined surface with a diameter gradually decreasing in diameter from the blocking section toward the output side land section side to guide a flow of the fluid flowing from the lead-in port to the discharge port.

Consequently, when the fluid flows from the channel for output to the channel for discharge, it is possible to suppress force generated by the flow of the fluid from acting on the spool.

It is desirable that the spool valve includes a feedback port which is disposed to be connected to a channel divided from the channel for output and leads the fluid to a space in the input side land section on an opposite side to the output side land section or a space in the output side land section on an opposite side to the input side land section.

Consequently, it is possible to adjust the fluid pressure acting on the spool.

Note that the components can be adopted in combination as much as possible.

Advantageous Effects of the Disclosure

As explained above, according to the present disclosure, it is possible to suppress an adverse effect on fluid pressure control due to a fluid pressure acting on the spool.

DRAWINGS

DETAILED DESCRIPTION

Modes for carrying out the present disclosure are illustratively explained in detail below on the basis of embodiments with reference to the drawings. However, dimensions, materials, shapes, relative dispositions, and the like of constituent components described in the embodiments are not meant to limit the scope of the present disclosure only thereto unless specifically described otherwise.

(First Embodiment)

Figure 1:
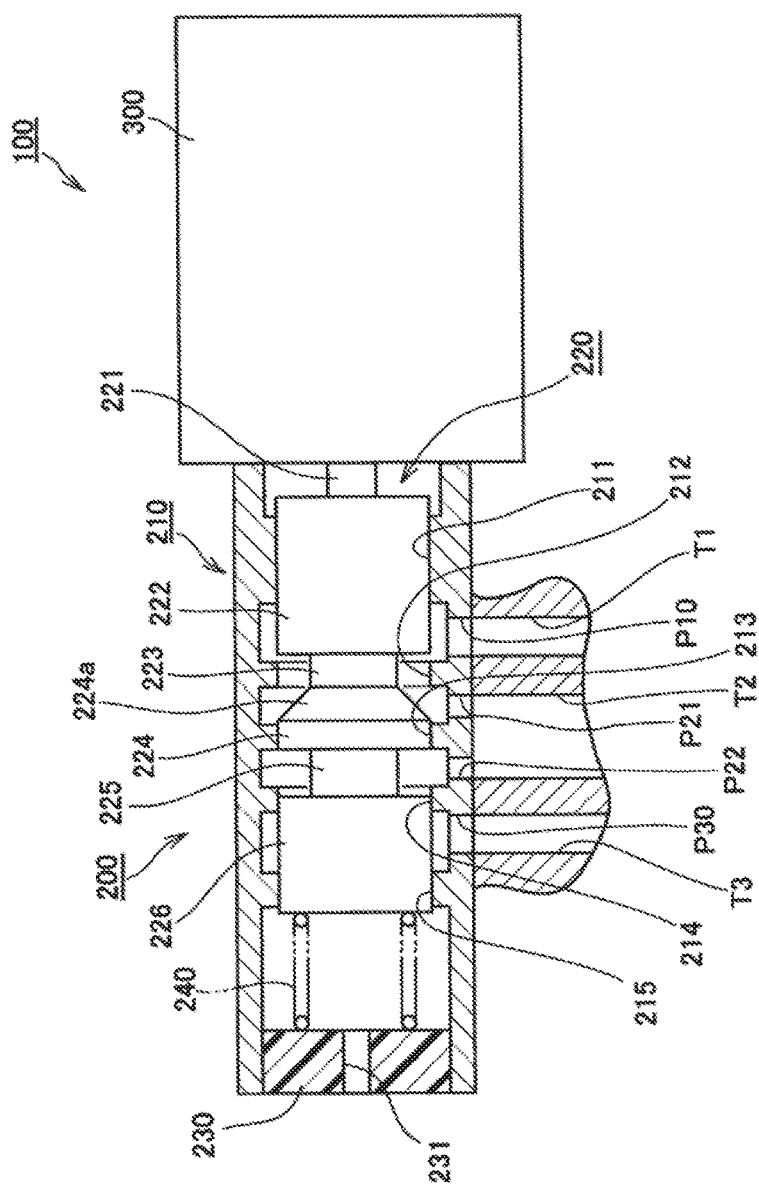
FIG. 1 is a schematic partial sectional view of a solenoid valve including a spool valve according to a first embodiment of the present disclosure.
Figure 2:
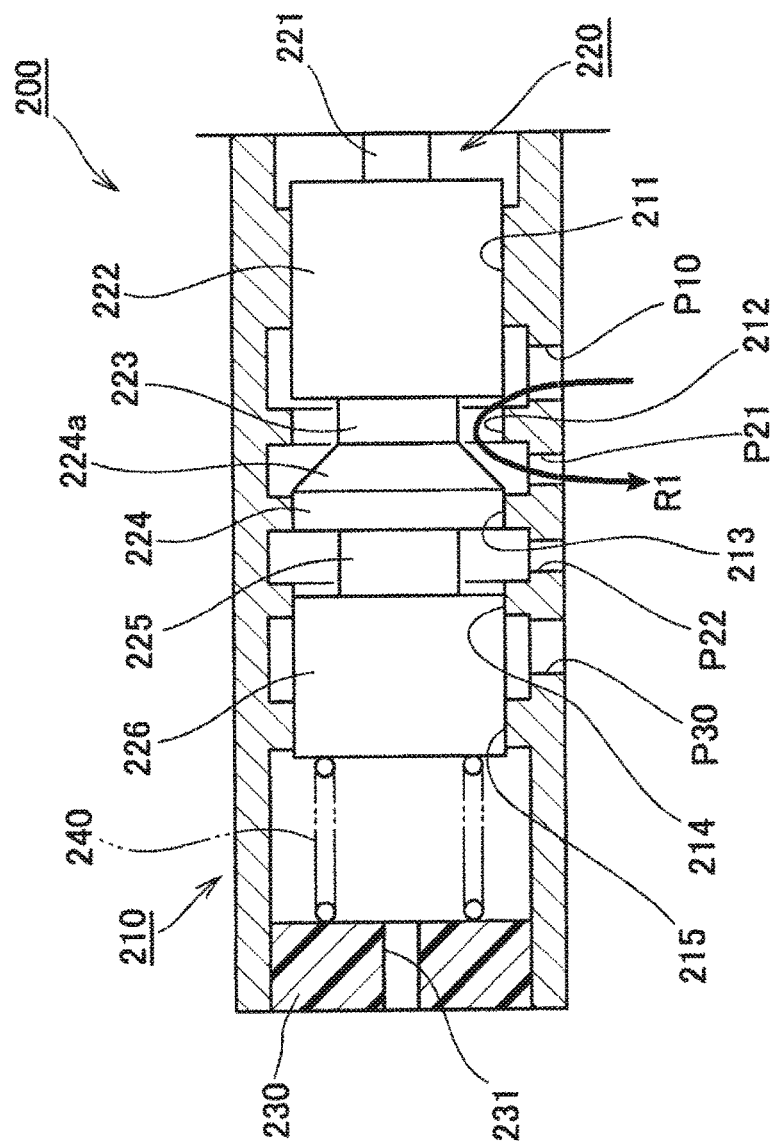
FIG. 2 is a schematic partial sectional view of the spool valve according to the first embodiment of the present disclosure.
Figure 3:
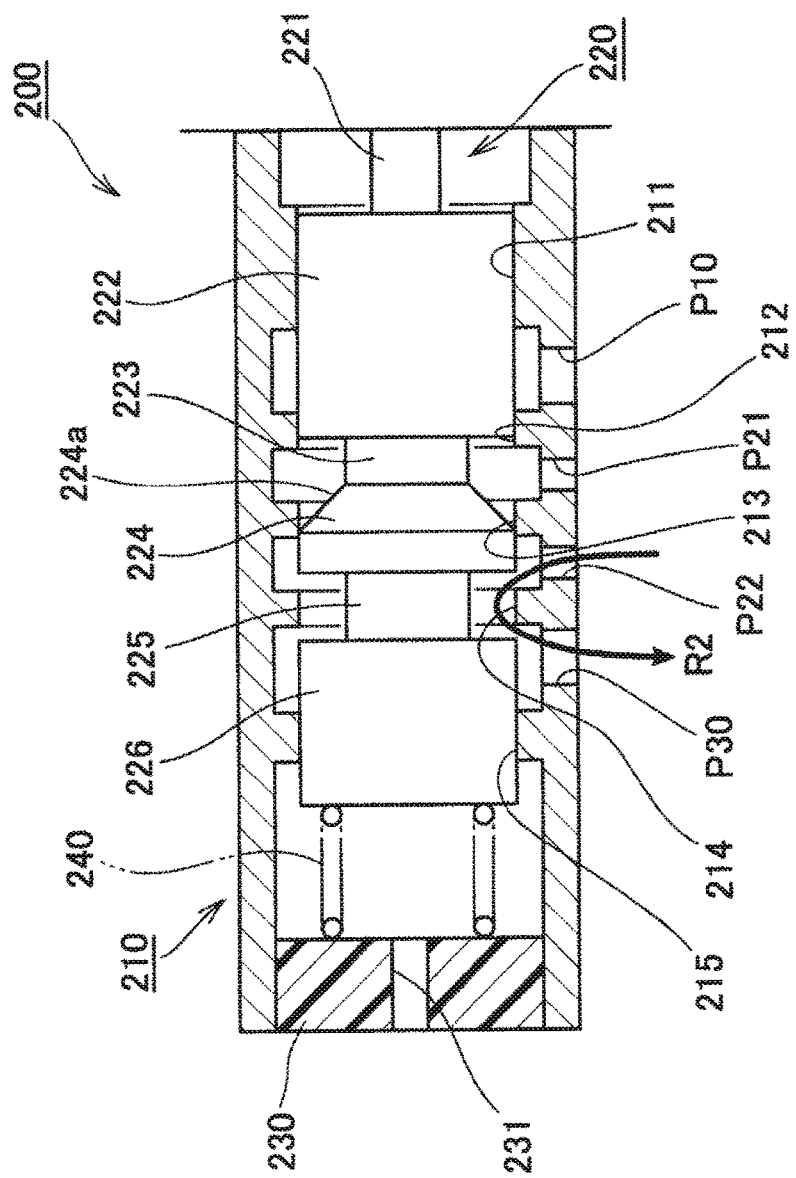
FIG. 3 is a schematic partial sectional view of the spool valve according to the first embodiment of the present disclosure.

A spool valve according to a first embodiment of the present disclosure is explained with reference to FIG. 1 to FIG. 3. Note that, in this embodiment, an example is explained in which the spool valve is applied to a solenoid valve. That is, in this embodiment, an actuator that drives a spool is a solenoid.

<Overall Configuration of the Solenoid Valve>

An overall configuration of the solenoid valve including the spool valve according to the first embodiment of the present disclosure is explained with reference to, in particular, FIG. 1. FIG. 1 is a schematic sectional view of the solenoid valve including the spool valve according to the first embodiment of the present disclosure. However, in FIG. 1, only concerning the spool valve, a cross section taken along a surface including a center axis is schematically shown. Concerning the solenoid, an exterior is briefly shown. In FIG. 1, a part of a channel provided on an apparatus side to which the solenoid valve is attached is schematically shown.

A solenoid valve 100 is configured from a spool valve 200 and a solenoid 300. Concerning the solenoid 300, since various publicly-known techniques are applicable, explanation of the solenoid 300 is omitted here. The solenoid valve 100 according to this embodiment is used to control a fluid pressure. In an apparatus to which the solenoid valve 100 is attached, a channel for input T1, a channel for output T2, and a channel for discharge T3 are provided.

A fluid set to a predetermined pressure flows to the channel for input T1. When the channel for input T1 and the channel for output T2 are connected by the solenoid valve 100, the fluid flows into the channel for output T2, whereby a fluid pressure in the channel for output T2 is controlled. For example, the fluid pressure in the channel for output T2 can be equalized with a fluid pressure of the fluid flowing in the channel for input T1. When the channel for output T2 and the channel for discharge T3 are connected by the solenoid valve 100, the fluid flowing in the channel for output T2 is discharged to the channel for discharge T3. Consequently, it is possible to reduce the fluid pressure of the fluid flowing in the channel for output T2. Further, by controlling an ON/OFF time for the solenoid 300, it is also possible to control the fluid pressure in the channel for output T2 to be a value lower than the fluid pressure in the channel for input T1.

The spool valve 200 includes a valve sleeve 210 and a spool 220 that reciprocates in the axis direction in the valve sleeve 210. As explained above, the spool 220 is driven by the solenoid 300. A lid 230 is fixed to an end portion of the valve sleeve 210 on the opposite side to the solenoid 300. A spring 240 that urges the spool 220 toward the solenoid 300 side is attached to the lid 230. When an electric current is fed to a not-shown coil provided in the solenoid 300 (when the solenoid 300 is on), the spool 220 moves to the left side in FIG. 1 resisting an urging force of the spring 240. When an electric current is not fed to the coil (when the solenoid 300 is off), the spool 220 moves to the right side in FIG. 1 with the urging force of the spring 240. A through-hole 231 for allowing leaked fluid to escape to the outside of the spool valve 200 is provided in the lid 230.

The valve sleeve 210 includes an input port P10, an output port P21, a lead-in port P22, and a discharge port P30. In a state in which the solenoid valve 100 is attached to the apparatus, the input port P10 is disposed to be connected to the channel for input T1. The discharge port P30 is disposed to be connected to the channel for discharge T3. Both of the output port P21 and the lead-in port P22 are disposed to be connected to the channel for output T2. The output port P21 plays a role for discharging the fluid flowed in from the input port P10 to the channel for output T2. The lead-in port P22 plays a role for leading the fluid from the channel for output T2 into the valve sleeve 210 in order to discharge the fluid from the discharge port P30.

On the inner circumferential surface of the valve sleeve 210, a first annular convex section 211 is provided on the opposite side to the output port P21 across the input port P10, a second annular convex section 212 is provided between the input port P10 and the output port P21, a third annular convex section 213 is provided between the output port P21 and the lead-in port P22, a fourth annular convex section 214 is provided between the lead-in port P22 and the discharge port P30, and a fifth annular convex section 215 is provided on the opposite side to the lead-in port P22 across the discharge port P30.

Consequently, annular grooves are respectively formed among the annular convex sections adjacent to one another. That is, among the annular convex sections adjacent to one another, annular gaps are respectively formed between the outer circumferential surface of the spool 220 and the inner circumferential surface of the valve sleeve 210. Consequently, opening sections to the inner circumferential surface side of the valve sleeve 210 in the respective ports are respectively opened to the annular gaps. Therefore, it is possible to smooth a flow of the fluid between the inner side and the outer side of the valve sleeve 210 via the ports. Note that, in this embodiment, all of the inner diameters of the plurality of annular convex sections are set to be equal to one another.

The spool 220 includes, in order from the input port P10 side toward the discharge port P30 side, a first small diameter section 221, a first land section 222 functioning as an input side land section, a second small diameter section 223, a second land section 224 functioning as a blocking section, a third small diameter section 225, and a third land section 226 functioning as an output side land section. The first small diameter section 221 is fixed to a not-shown plunger provided in the solenoid 300, a rod fixed to the plunger, and the like. Consequently, the spool 220 can be reciprocated by the solenoid 300.

In this embodiment, the outer diameters of the first land section 222, the second land section 224, and the third land section 226 are set larger than the outer diameters of the first small diameter section 221, the second small diameter section 223, and the third small diameter section 225, and are set to be equal to one another. The outer diameters of the first land section 222, the second land section 224, and the third land section 226 are set to be substantially equal to the inner diameters of the first annular convex section 211, the second annular convex section 212, the third annular convex section 213, the fourth annular convex section 214, and the fifth annular convex section 215. Consequently, the outer circumferential surface of the first land section 222 is capable of sliding with respect to the inner circumferential surface of the first annular convex section 211 and the inner circumferential surface of the second annular convex section 212. The outer circumferential surface of the second land section 224 is capable of sliding with respect to the inner circumferential surface of the third annular convex section 213. Further, the outer circumferential surface of the third land section 226 is capable of sliding with respect to the inner circumferential surface of the fourth annular convex section 214 and the inner circumferential surface of the fifth annular convex section 215.

In the spool 220, an inclined surface 224*a* gradually decreasing in diameter from the second land section 224 toward the first land section 222 side is provided. Note that, in this embodiment, the inclined surface 224*a* is configured by a taper surface. However, the inclined surface 224*a* does not have to be a taper surface as long as the inclined surface 224*a* is an inclined surface gradually decreasing in diameter from the second land section 224 toward the first land section 222 side.

<Explanation of the Operation of the Spool Valve>

The operation of the spool valve 200 according to this embodiment is explained with reference to, in particular, FIG. 2 and FIG. 3. The spool 220 according to this embodiment is configured to be capable of moving to a first position for discharging the fluid having desired pressure from the output port P21 and a second position for discharging the fluid from the discharge port P30. FIG. 2 shows a case in which the spool 220 is located in the first position. FIG. 3 shows a case in which the spool 220 is located in the second position.

First, the case in which the spool 220 is located in the first position is explained with reference to FIG. 2. In this case, the outer circumferential surface of the first land section 222 is in contact with the inner circumferential surface of the first annular convex section 211 and is separated from the second annular convex section 212. The outer circumferential surface of the third land section 226 is in contact with the inner circumferential surface of the fourth annular convex section 214. Therefore, a channel leading from the input port P10 to the output port P21 is formed. A channel leading from the lead-in port P22 to the discharge port P30 is blocked. Consequently, the fluid flowed in from the input port P10 is discharged from the output port P21 (in the figure, see an arrow R1).

In this embodiment, when the spool 220 is located in the first position, the outer circumferential surface of the second land section 224 is in contact with the inner circumferential surface of the third annular convex section 213. Consequently, a passage between the spool 220 and the valve sleeve 210 is blocked in a position between the output port P21 and the lead-in port P22.

A case in which the spool 220 is located in the second position is explained with reference to FIG. 3. In this case, the outer circumferential surface of the first land section 222 is in contact with the inner circumferential surface of the second annular convex section 212. The outer circumferential surface of the third land section 226 is separated from the fourth annular convex section 214. Therefore, the channel leading from the input port P10 to the output port P21 is blocked. The channel leading from the lead-in port P22 to the discharge port P30 is formed. Consequently, the fluid is discharged from the discharge port P30 (see an arrow R2 in the figure).

In this embodiment, when the spool 220 is located in the second position, the outer circumferential surface of the second land section 224 is in contact with the inner circumferential surface of the third annular convex section 213. Consequently, the passage between the spool 220 and the valve sleeve 210 is blocked in the position between the output port P21 and the lead-in port P22.

Note that, in this embodiment, although not shown in the figure in particular, when the spool 220 is located in the middle between the first position and the second position, the outer circumferential surface of the first land section 222 is in contact with the inner circumferential surface of the second annular convex section 212. The outer circumferential surface of the third land section 226 is in contact with the inner circumferential surface of the fourth annular convex section 214. Consequently, the channel leading from the input port P10 to the output port P21 is blocked. The channel leading from the lead-in port P22 to the discharge port P30 is also blocked. There, it is possible to keep the fluid pressure in the channel for output T2 fixed.

<Merits of the Spool Valve According to this Embodiment>

With the spool valve 200 according to this embodiment, in a state in which the channel for input T1 and the channel for output T2 are connected via the input port P10 and the output port P21, the passage between the spool 220 and the valve sleeve 210 is blocked by the second land section 224 in the position between the output port P21 and the lead-in port P22. Consequently, when the fluid flows from the channel for input T1 to the channel for output T2, it is possible to suppress the fluid from circulating to the opposite side to the output port P21 via the second land section 224. Therefore, when the fluid flows from the channel for input T1 to the channel for output T2, it is possible to suppress the spool 220 from receiving a fluid pressure from the opposite side to the output port P21 via the second land section 224. Consequently, it is possible to suppress an adverse effect on the fluid pressure control due to the fluid pressure acting on the spool 220.

In a state in which the channel for output T2 and the channel for discharge T3 are connected via the lead-in port P22 and the discharge port P30, the passage between the spool 220 and the valve sleeve 210 is blocked by the second land section 224 in the position between the output port P21 and the lead-in port P22. Consequently, when the fluid flows from the channel for output T2 to the channel for discharge T3, it is possible to suppress the fluid from circulating to the opposite side to the discharge port P30 via the second land section 224. Therefore, when the fluid flows from the channel for output T2 to the channel for discharge T3, it is possible to suppress the spool 220 from receiving a fluid pressure from the opposite side to the discharge port P30 via the second land section 224.

In this embodiment, the outer diameter of the first land section 222 and the outer diameter of the second land section 224 are set to be equal. Consequently, when the fluid flows from the channel for input T1 to the channel for output T2, a fluid pressure acting on the first land section 222 in the axis direction and a fluid pressure acting on the second land section 224 in the axis direction can be set to forces in opposite directions and substantially the same. Therefore, it is possible to substantially eliminate the influence of force in the axis direction on the spool 220 due to the fluid pressure.

In this embodiment, the outer diameter of the second land section 224 and the outer diameter of the third land section 226 are also set to be equal. Consequently, when the fluid flows from the channel for output T2 to the channel for discharge T3, a fluid pressure acting on the second land section 224 in the axis direction and a fluid pressure acting on the third land section 226 in the axis direction can be set to forces in opposite directions and substantially the same. Therefore, it is possible to substantially eliminate the influence of force in the axis direction on the spool 220 due to the fluid pressure.

Further, in this embodiment, in the spool 220, the inclined surface 224a gradually decreasing in diameter from the second land section 224 toward the first land section 222 side is provided. Consequently, a flow of the fluid flowing from the input port P10 toward the output port P21 is guided. Therefore, when the fluid flows from the channel for input T1 to the channel for output T2, it is possible to suppress force generated by the flow of the fluid from acting on the spool 220.

(Second Embodiment)

Figure 4:
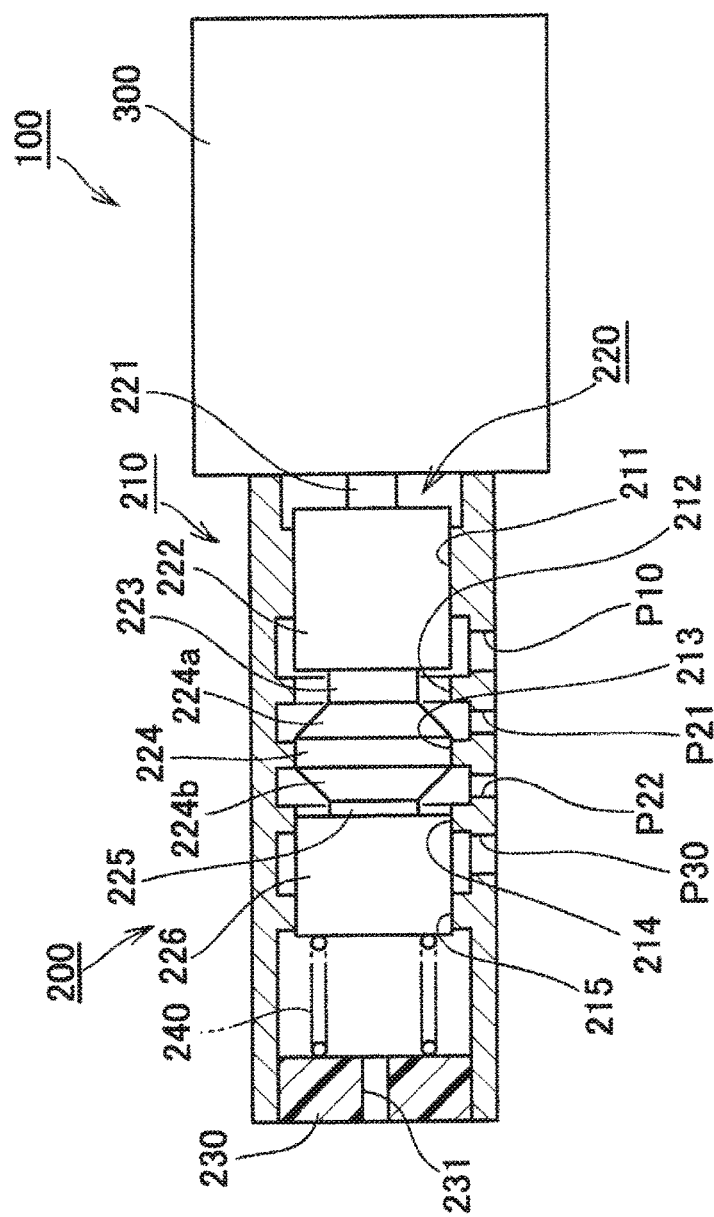
FIG. 4 is a schematic partial sectional view of a solenoid valve including a spool valve according to a second embodiment of the present disclosure.

A second embodiment of the present disclosure is shown in FIG. 4. In the first embodiment, the configuration is explained in which the inclined surface gradually decreasing in diameter from the second land section toward the first land section side is provided. However, in this embodiment, a configuration is explained in which an inclined surface gradually decreasing in diameter from the second land section toward the third land section side is further provided. The other components and action are the same as those in the first embodiment. Therefore, the same constituent portions are denoted by the same reference numerals and signs and explanation of the constituent portions is omitted.

FIG. 4 is a schematic sectional view of a solenoid valve including a spool valve according to the second embodiment of the present disclosure. However, in FIG. 4, only concerning the spool valve, a cross section taken along a surface including a center axis is schematically shown. Concerning a solenoid, an exterior is briefly shown.

In the spool 220 according to this embodiment, in addition to the components explained in the first embodiment, an inclined surface 224b gradually decreasing in diameter from the second land section 224 toward the third land section 226 side is provided. Note that, in this embodiment, the inclined surface 224b is configured by a taper surface. However, the inclined surface 224b does not have to be the taper surface as long as the inclined surface 224b is an inclined surface gradually decreasing in diameter from the second land section 224 toward the third land section 226 side.

The other components concerning the spool 220 and components such as the valve sleeve 210 other than the spool 220 are the same as the components explained in the first embodiment. Therefore, explanation of the components is omitted.

In the spool valve 200 according to this embodiment, action and effects same as those in the first embodiment can be obtained. In the case of the spool valve 200 according to this embodiment, in the spool 220, the inclined surface 224b gradually decreasing in diameter from the second land section 224 toward the third land section 226 side is provided. Consequently, a flow of the fluid flowing from the lead-in port P22 toward the discharge port P30 is guided. Therefore, when the fluid flows from the channel for output T2 to the channel for discharge T3, it is possible to suppress force generated by the flow of the fluid from acting on the spool 220.

(Third Embodiment)

Figure 5:
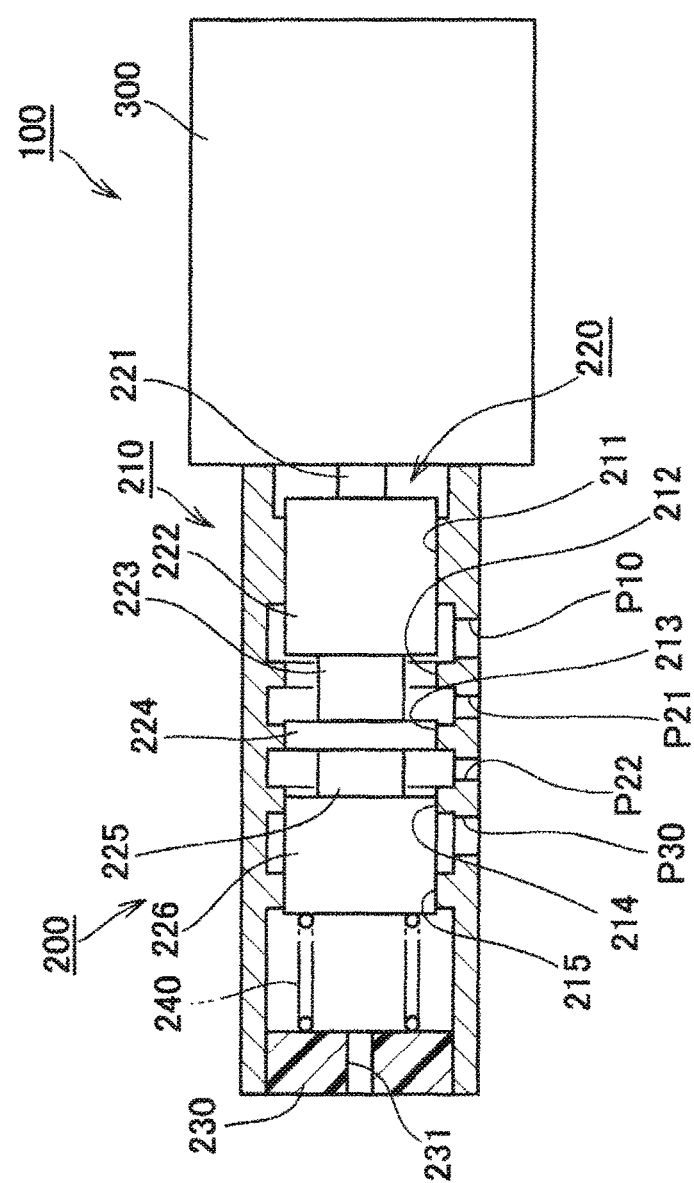
FIG. 5 is a schematic partial sectional view of a solenoid valve including a spool valve according to a third embodiment of the present disclosure.

A third embodiment of the present disclosure is shown in FIG. 5. In the first embodiment, the configuration is explained in which the inclined surface gradually decreasing in diameter from the second land section toward the first land section side is provided. However, in this embodiment, a configuration is explained in which such an inclined surface is not provided. The other components and action are the same as those in the first embodiment. Therefore, the same constituent portions are denoted by the same reference numerals and signs and explanation of the constituent portions is omitted.

FIG. 5 is a schematic sectional view of a solenoid valve including a spool valve according to the third embodiment of the present disclosure. However, in FIG. 5, only concerning the spool valve, a cross section taken along a surface including a center axis is schematically shown. Concerning a solenoid, an exterior is briefly shown.

In the spool 220 according to this embodiment, inclined surfaces are not provided on both sides of the second land section 224. That is, a configuration is adopted in which the inclined surface 224a is not provided in the configuration of the spool 220 according to the first embodiment.

The other components concerning the spool 220 and components such as the valve sleeve 210 other than the spool 220 are the same as the components explained in the first embodiment. Therefore, explanation of the components is omitted.

In the case of the spool valve 200 according to this embodiment, the action and effects by the inclined surface 224a in the first embodiment are not generated. However, the other action and effects are the same as those in the first embodiment.

(Fourth Embodiment)

Figure 6:
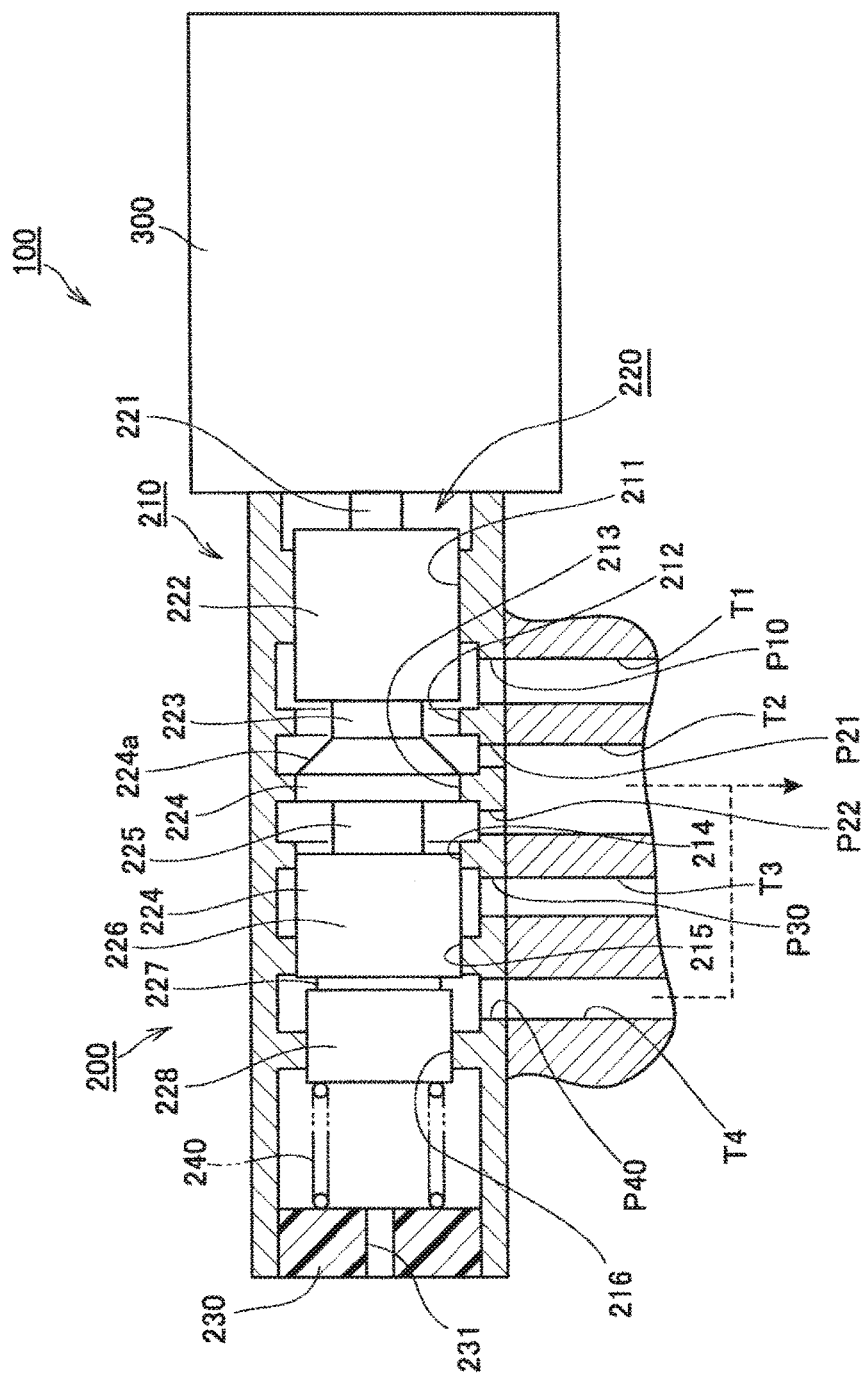
FIG. 6 is a schematic partial sectional view of a solenoid valve including a spool valve according to a fourth embodiment of the present disclosure.
Figure 7:
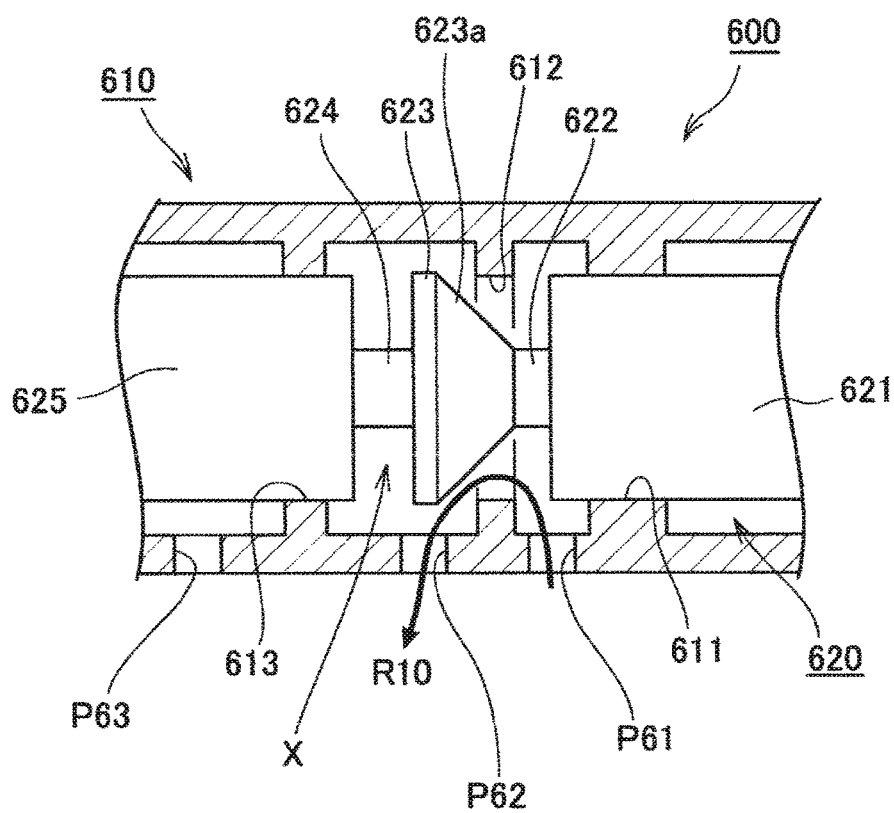
FIG. 7 is a schematic partial sectional view showing the vicinity of a main constituent portion of a spool valve according to a conventional example.

In FIG. 6, a fourth embodiment of the present disclosure is shown. In this embodiment, a configuration is explained in which a structure for adjusting a fluid pressure acting on a spool in the axis direction is provided in addition to the components explained in the first embodiment. The other components and action are the same as those in the first embodiment. Therefore, the same constituent portions are denoted by the same reference numerals and signs and explanation of the constituent portions is omitted.

FIG. 6 is a schematic sectional view of a solenoid valve including a spool valve according to the fourth embodiment of the present disclosure. However, in FIG. 6, only concerning the spool valve, a cross section taken along a surface including a center axis is schematically shown. Concerning a solenoid, an exterior is briefly shown. In FIG. 6, a part of a channel provided on an apparatus side to which the solenoid valve is attached is schematically shown.

In the case of this embodiment, an apparatus to which the solenoid valve 100 is attached is provided with a channel T4 divided from the channel for output T2, besides the channel for input T1, the channel for output T2, and the channel for discharge T3.

The valve sleeve 210 according to this embodiment is provided with a feedback port P40, besides the input port P10, the output port P21, the lead-in port P22, and the discharge port P30. On the inner circumferential surface of the valve sleeve 210, a sixth annular convex section 216 is provided besides the first annular convex section 211, the second annular convex section 212, the third annular convex section 213, the fourth annular convex section 214, and the fifth annular convex section 215.

The spool 220 according to this embodiment is provided with a fourth small diameter section 227 and a fourth land section 228, besides the first small diameter section 221, the first land section 222, the second small diameter section 223, the second land section 224, the third small diameter section 225, and the third land section 226. Note that the outer circumferential surface of the fourth land section 228 is configured to slide with respect to the inner circumferential surface of the sixth annular convex section 216.

In this embodiment, in a state in which the solenoid valve 100 is attached to the apparatus, the feedback port P40 is disposed to be connected to the channel T4 divided from the channel for output T2. Consequently, fluid is led from the channel for output T2 to a space in the third land section 226 on the opposite side to the first land section 222. That is, a fluid pressure in this space is equal to a fluid pressure in the channel for output T2.

Force applied to the spool 220 in the axis direction by the fluid pressure in this space changes according to a difference between the outer diameter of the third land section 226 and the outer diameter of the fourth land section 228. Therefore, by setting the outer diameter of the fourth land section 228 as appropriate, it is possible to adjust the force applied to the spool 220 in the axis direction.

With the configuration explained above, in the spool valve 200 according to this embodiment, it is possible to obtain action and effects same as the action and effects in the case of the first embodiment. In the case of this embodiment, the fluid pressure in the space in the third land section 226 on the opposite side to the first land section 222 is equalized with the fluid pressure in the channel for output T2 by the fluid led into the valve sleeve 210 via the feedback port P40. Consequently, it is possible to adjust the force applied to the spool 220 in the axis direction.

(Others)

In the first embodiment, the configuration is explained in which the inclined surface gradually inclining from the second land section toward the first land section side is provided. In the second embodiment, the configuration is explained in which the inclined surfaces are provided on both the sides of the second land section. However, it is also possible to adopt a configuration in which the inclined surface gradually decreasing in diameter from the second land section toward the third land section side is provided and the inclined surface gradually inclining from the second land section toward the first land section side is not provided.

In the embodiments, the four ports are used as the input port, the output port, the lead-in port, and the discharge port in order from the solenoid 300 side toward the opposite side thereto. However, depending on a channel of the apparatus to which the solenoid valve 100 is attached, the four ports can also be used as the discharge port, the lead-in port, the output port, and the input port in order from the solenoid 300 side toward the opposite side thereto.

In the fourth embodiment, the configuration is explained in which the fluid is led from the channel for output T2 to the space in the third land section 226 (the output side land section) on the opposite side to the first land section 222 (the input side land section). However, although not particularly illustrated, it is also possible to adopt a configuration in which the fluid is led from the channel for output T2 to a space in the first land section 222 (the input side land section) on the opposite side to the third land section 226 (the output side land section). In this case, it goes without saying that the feedback port is provided on the opposite side to the output port with respect to the input port.

REFERENCE SIGNS LIST

100 Solenoid valve
200 Spool valve
210 Valve sleeve
211 First annular convex section
212 Second annular convex section
213 Third annular convex section
214 Fourth annular convex section
215 Fifth annular convex section
216 Sixth annular convex section
220 Spool
221 First small diameter section
222 First land section
223 Second small diameter section
224 Second land section
224a Inclined surface
224b Inclined surface
225 Third small diameter section
226 Third land section
227 Fourth small diameter section
228 Fourth land section
230 Lid
231 Through-hole
240 Spring
300 Solenoid
P10 Input port
P21 Output port
P22 Lead-in port
P30 Discharge port
P40 Feedback port
T1 Channel for input
T2 Channel for output
T3 Channel for discharge
T4 Channel divided from the channel for output

The invention claimed is:

1. A spool valve comprising a spool that reciprocates in a valve sleeve, wherein
the valve sleeve includes:
an input port disposed to be connected to a channel for input;
an output port which is disposed to be connected to a channel for output and discharges fluid flowed in from the input port, to the channel for output;
a discharge port disposed to be connected to a channel for discharge; and
a lead-in port which is disposed to be connected to the channel for output and guides the fluid into the valve sleeve in order to discharge the fluid from the discharge port, wherein the output port and the lead-in-port are disposed directly next to each other in the valve sleeve with a convex land portion disposed directly between the output port and the lead-in-port and a common channel for output in communication with the output port and the lead-in-port exterior to the valve sleeve, and
the spool is provided with a blocking section configured to prevent the fluid from flowing between the output port and the lead-in port inside the spool valve when the spool is located in a first position, a second position, or any positions between the first and second positions,
the first position being a position for connecting the channel for input and the channel for output via the input port and the output port and blocking a channel leading from the channel for output to the channel for discharge, and
the second position being a position for connecting the channel for output and the channel for discharge via the lead-in port and the discharge port and blocking a channel leading from the channel for input to the channel for output.

2. The spool valve according to claim 1, wherein the blocking section is disposed between
an input side land section provided on the input port side and
an output side land section provided on the output port side, and
an outer diameter of the blocking section is set to be equal to an outer diameter of the input side land section.

3. The spool valve according to claim 2, further comprising an inclined surface with a diameter gradually decreasing from the blocking section toward the input side land section side to guide a flow of the fluid flowing from the input port to the output port.

4. The spool valve according to claim 2, further comprising an inclined surface with a diameter gradually decreasing from the blocking section toward the output side land section side to guide a flow of the fluid flowing from the lead-in port to the discharge port.

5. The spool valve according to claim 2, further comprising a feedback port which is disposed to be connected to a channel divided from the channel for output and leads the fluid to
a space in the input side land section on an opposite side to the output side land section or
a space in the output side land section on an opposite side to the input side land section.

6. The spool valve according to claim 3, further comprising an inclined surface with a diameter gradually decreasing from the blocking section toward the output side land section side to guide a flow of the fluid flowing from the lead-in port to the discharge port.

7. The spool valve according to claim 3, further comprising a feedback port which is disposed to be connected to a channel divided from the channel for output and leads the fluid to
a space in the input side land section on an opposite side to the output side land section or a space in the output side land section on an opposite side to the input side land section.

8. The spool valve according to claim 4, further comprising a feedback port which is disposed to be connected to a channel divided from the channel for output and leads the fluid to
a space in the input side land section on an opposite side to the output side land section or
a space in the output side land section on an opposite side to the input side land section.

* * * * *